(12) United States Patent
Glasser et al.

(10) Patent No.: US 10,084,889 B2
(45) Date of Patent: *Sep. 25, 2018

(54) MULTICAST-UNICAST PROTOCOL CONVERTER

(71) Applicant: AT&T Intellectual Property I, L.P., Atlanta, GA (US)

(72) Inventors: Alan L. Glasser, Manalapan, NJ (US); Andrew G. Gauld, Middletown, NJ (US); John F. Lucas, Tinton Falls, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/413,538

(22) Filed: Jan. 24, 2017

(65) Prior Publication Data

US 2017/0134534 A1 May 11, 2017

Related U.S. Application Data

(63) Continuation of application No. 15/140,635, filed on Apr. 28, 2016, now Pat. No. 9,571,609, which is a (Continued)

(51) Int. Cl.
*H04L 29/06* (2006.01)
*H04L 12/18* (2006.01)
(Continued)

(52) U.S. Cl.
CPC .............. *H04L 69/08* (2013.01); *H04L 12/18* (2013.01); *H04L 12/4633* (2013.01); *H04L 61/2069* (2013.01); *H04L 67/42* (2013.01)

(58) Field of Classification Search
CPC ......... H04L 69/08; H04L 69/40; H04L 12/18; H04L 12/1836; H04L 12/4633; H04L 61/2069; H04L 67/02; H04L 67/42
See application file for complete search history.

(56) References Cited

U.S. PATENT DOCUMENTS

5,459,725 A 10/1995 Kaplan et al.
6,011,782 A 1/2000 Desimone et al.
(Continued)

*Primary Examiner* — Un C Cho
*Assistant Examiner* — Jeremy Costin
(74) *Attorney, Agent, or Firm* — Akerman LLP; Michael K. Dixon; Mammen (Roy) P. Zachariah, Jr.

(57) ABSTRACT

A protocol converter includes a processor configured to receive a request for content from a client system. The processor is further configured to determine if the protocol converter is currently receiving the content through the multicast session, and join the multicast session if the protocol converter is not currently receiving the content. Additionally, the processor is configured to receive the content as an end point of the multicast session, format the content for communication to the client system, and provide content to the client system in a communication separate from the multicast session. Receiving the content as an end point of the multicast session can include terminating the application layer protocol used by the multicast session. Additionally, formatting the content can include re-encapsulating the content as hypertext transport protocol (HTTP) with an appropriate content-type.

20 Claims, 5 Drawing Sheets

Related U.S. Application Data continuation of application No. 14/519,815, filed on Oct. 21, 2014, now Pat. No. 9,350,827, which is a continuation of application No. 12/562,825, filed on Sep. 18, 2009, now Pat. No. 8,867,539.

(51) Int. Cl.
 *H04L 12/46* (2006.01)
 *H04L 29/12* (2006.01)

(56) References Cited

U.S. PATENT DOCUMENTS

| | | | |
|---|---|---|---|
| 6,163,810 A | 12/2000 | Bhagavath et al. | |
| 6,181,697 B1 | 1/2001 | Nurenberg et al. | |
| 6,259,701 B1 | 7/2001 | Shur | |
| 6,269,080 B1 | 7/2001 | Kumar et al. | |
| 6,580,722 B1 | 6/2003 | Perlman et al. | |
| 6,704,576 B1 | 3/2004 | Brachman et al. | |
| 6,763,019 B2 | 7/2004 | Mehta et al. | |
| 6,782,490 B2 | 8/2004 | Zelezniak et al. | |
| 6,931,005 B1 | 8/2005 | Wilhelm et al. | |
| 7,031,326 B1 | 4/2006 | Shur | |
| 7,224,702 B2 | 5/2007 | Lee et al. | |
| 7,281,058 B1 | 10/2007 | Shepherd et al. | |
| 7,327,719 B2 | 2/2008 | Hardisty et al. | |
| 2002/0097728 A1 | 7/2002 | Hinderks et al. | |
| 2002/0143951 A1 | 10/2002 | Khan et al. | |
| 2004/0221029 A1 | 11/2004 | Jenkins et al. | |
| 2004/0226045 A1 | 11/2004 | Nadarajah et al. | |
| 2005/0201406 A1 | 9/2005 | Sekine et al. | |
| 2005/0216910 A1 | 9/2005 | Marchand et al. | |
| 2005/0216942 A1 | 9/2005 | Barton et al. | |
| 2006/0018335 A1 | 1/2006 | Koch et al. | |
| 2006/0039388 A1* | 2/2006 | Shur | H04L 12/185 370/401 |
| 2006/0233154 A1 | 10/2006 | Eckert et al. | |
| 2006/0268917 A1 | 11/2006 | Nadarajah et al. | |
| 2007/0002858 A1 | 1/2007 | Bichot et al. | |
| 2007/0008979 A1 | 1/2007 | Keller-Tuberg et al. | |
| 2007/0011237 A1 | 1/2007 | Mockett | |
| 2008/0008167 A1 | 1/2008 | Ver et al. | |
| 2008/0077701 A1 | 3/2008 | Kongalath et al. | |
| 2008/0212613 A1 | 9/2008 | Perkinson et al. | |
| 2008/0216177 A1 | 9/2008 | Yokosato et al. | |
| 2009/0052450 A1 | 2/2009 | Mockett et al. | |
| 2009/0147718 A1 | 6/2009 | Liu et al. | |
| 2010/0131660 A1 | 5/2010 | Dec et al. | |
| 2010/0145794 A1 | 6/2010 | Barger et al. | |

\* cited by examiner

MULTICAST-UNICAST PROTOCOL CONVERTER

CROSS REFERENCE TO RELATED APPLICATIONS

This application is a continuation of U.S. patent application Ser. No. 15/140,635, filed on Apr. 28, 2016, which is a continuation of U.S. patent application Ser. No. 14/519,815, filed on Oct. 21, 2014, now U.S. Pat. No. 9,350,827, which is a continuation of and claims priority to U.S. patent application Ser. No. 12/562,825, filed on Sep. 18, 2009, now U.S. Pat. No. 8,867,539, each of which is hereby incorporated by reference in its entirety.

FIELD OF THE DISCLOSURE

The present disclosure generally relates to communications networks, and more particularly relates to a multicast-unicast protocol converter.

BACKGROUND

Packet-switched networks, such as networks based on the TCP/IP protocol suite, can distribute a rich array of digital content to a variety of client applications. One popular application is a personal computer browser for retrieving documents over the Internet written in the Hypertext Markup Language (HTML). Frequently, these documents include embedded content. Where once the digital content consisted primarily of text and static images, digital content has grown to include audio and video content as well as dynamic content customized for an individual user. Additionally, digital content can include updates such as software and programming updates.

Unicast protocols offer point-to-point communication between a server and a single client that can be used for delivering content. Multicast protocols can allow substantially simultaneous distribution of digital content to a large number of clients without creating multiple point-to-point connections. The server can provide the content to a multicast group with each member of the multicast group receiving a copy of the content at substantially the same time.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF THE DRAWINGS

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily limit any of the various claimed inventions. Moreover, some statements may apply to some inventive features but not to others.

Figure 1:
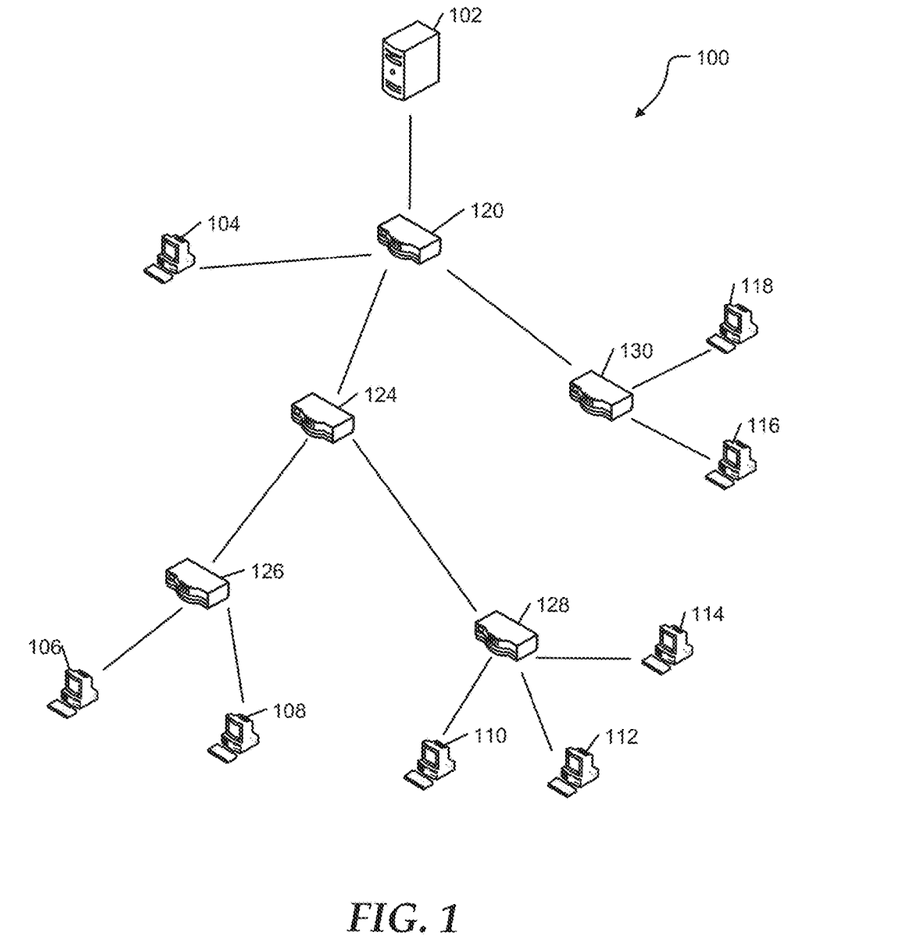
FIG. 1 is a block diagram illustrating a communications network in accordance with one embodiment of the present disclosure.

FIG. 1 shows a multicast tree 100 for distributing digital content through a geographically dispersed network, such as the Internet. Multicast tree 100 can include a server 102 and client systems 104, 106, 108, 110, 112, 114, 116, and 118. Server 102 and client systems 104, 106, 108, 110, 112, 114, 116, and 118 can communicate through a network of distribution points 120, 124, 126, 128, and 130. The distribution points 120, 124, 126, 128, and 130 may be routers. Alternatively, the distribution points 120, 124, 126, 128, and 130 may be nodes of an overlay network. For example, communication from server 102 can travel through distribution points 120, 124, and 126 to client system 108 while communication from server 102 can travel through distribution points 120 and 130 to client 116. It will be appreciated that multicast tree 100 may be a logical overlay of a mesh network that, for example, may have a direct connection from distribution point 130 to 128, and also, for example, may have a direct connection from distribution point 126 to 130. These distribution points may be multicast-enabled routers. The distribution points may have the ability to cache content not only for immediate forwarding but also for later retransmission.

Server 102 can use Internet Protocol (IP) multicast or any other multicast protocol to substantially simultaneously distribute digital content, such as a software update, to the client systems 104, 106, 108, 110, 112, 114, 116, and 118. The data file can be divided into multiple segments or data packets that may be, but are not necessarily IP packets, Ethernet frames, or similar lower layer packets. Using a multicast protocol, each such segment or data packet can move over each link of the network only once. The distribution points 120, 124, 126, 128, and 130 can create copies, or otherwise forward incoming data on one port to multiple outbound ports, when the paths to the destinations split. For example, server 102 can send a multicast data packet to distribution point 120. Distribution point 120 can send a copy of the data packet to each of client 104, distribution point 124, and distribution point 130. Similarly, distribution point 130 can send, forward, or route, a copy of the segment, data packet, or individual low layer packets to each of client systems 116 and 118, and distribution point 124 can send a copy of the data packet to each of distribution points 126 and 128. Further, distribution point 126 can send a copy of the data packet to each of client systems 106 and 108 and distribution point 128 can send a copy of the data packet to each of client systems 110, 112, and 114. In other embodiments, the network underlying multicast tree 100 may be a shared medium, such as a bus or ring, with multicast occurring at a low network layer via common physical components and a common media access structure.

Generally, the distribution points construct the multicast tree 100 when client systems join a multicast group, and the server 102 may not have information about each member of the multicast group. Specifically, client systems can notify the network that they are interested in receiving data packets sent to the multicast group, such as by Internet Group Management Protocol. The server 102 can send a message addressed to the multicast group and each distribution point can replicate the data packet for each system of the multicast group.

The multicast tree 100 can include five multicast subtrees, each defined by a respective root node coupled with a path to the root node from the origin server 102. For example, there is a subtree comprising distribution node 126 as well as endpoints 106 and 108, coupled with path 102-120-124-126. There is also a subtree rooted at node 124, further comprising nodes 126 and 128 and endpoints 106, 108, 110, 112, and 114, coupled with path 102-120-124.

In any multicast transmission, data packets can be lost due to congestion in the network or corruption of packet contents. In some applications, such as real-time streaming of audio-visual content, a small percentage of packet loss can be tolerated. However, in other applications, the multicast delivery system may employ techniques such as packet retransmission or forward error correction (FEC) to ensure that the content is delivered without loss or corruption. The server 102 may implement the necessary techniques to receive the content without loss or corruption. In addition, the unicast transmission of content from the server 102 to the client system may be subject to packet loss or corruption. The server 102 and the client system may use a set of techniques, completely independent of those used on the multicast transmission, to assure that the content is received without loss or corruption by the client system. For example, the unicast communication between the server 102 and the client could use transmission control protocol (TCP).

Figure 2:
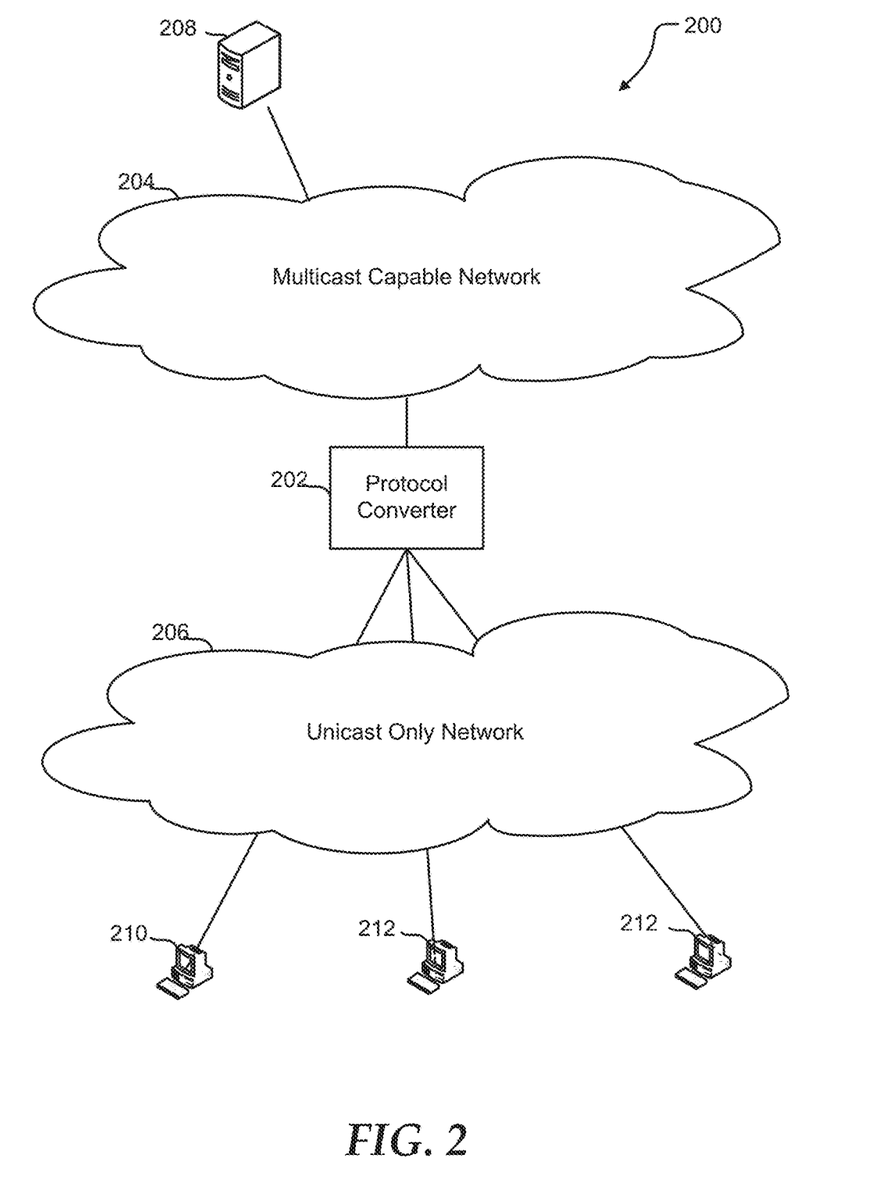
FIG. 2 is a block diagram illustrating an exemplary network environment of a multicast-unicast protocol converter in accordance with an embodiment of the present disclosure.

FIG. 2 illustrates a network environment, generally designated 200, for a multicast-unicast protocol converter. Protocol Converter 202 can be between a multicast capable network 204 and a unicast only network 206. Multicast capable network 204 can include network components, such as distribution point 120, capable of supporting a multicast tree, such as multicast tree 100. In contrast, at least a portion of the network components in unicast only network 206 can be unable to support a multicast tree. Accordingly, communication through unicast only network 206 can include only one-to-one communication.

Content server 208 can provide content using a multicast protocol to a multicast tree including protocol converter 202. Protocol converter 202 can receive the content using the multicast protocol, extract the content, and provide the content to client systems 210, 212, and 214 as multiple one-to-one communication flows. Client systems 210, 212, and 214 may not distinguish between content originally provided using a multicast protocol and content originally provided using a unicast protocol.

In an embodiment, protocol converter 202 can handle joining and leaving a multicast group based on the content being requested by client systems 210, 212, and 214. For example, client system 210 may request content, such as an internet radio stream, from protocol converter 202. Protocol converter 202 can join the multicast tree that is being used to deliver the content. Protocol converter 202 can provide the content to client system 210. If client system 214 requests the same content, protocol converter 202 can identify that protocol converter 202 is already receiving the content as part of the multicast tree and provide the content to client system 214. Additionally, protocol converter 202 can monitor the connections to client systems 210 and 214 and leave the multicast tree when both client system 210 and 214 have stopped receiving the content.

In an embodiment, a number of protocol converters can be located throughout the network. Generally, the protocol converters can be located close to the client system, such as at a service access point. For example, the link between the client system and a service access point, such as a Digital Subscriber Line Access Multiplexer (DSLAM) or a Serving GPRS Support Node (SGSN), may not support multicast sessions. Protocol converter 202 can be co-located with a service access point providing client systems access to content available via multicast. Alternatively, the service access point and the protocol converter can be combined into a single device. By way of an example, a digital subscriber line (DSL) may not support multicast sessions. Protocol converter 202 can provide the DSL subscriber with access to multicast content without the need for additional client software to tunnel the multicast session through a unicast connection over DSL.

In an additional embodiment, each of a plurality of protocol converters can respond to a shared anycast address. A request from a client system to the anycast address can be routed to the closest protocol converter. Additionally, each protocol converter may utilize Border Gateway Protocol (BGP) to announce or withdraw a route to the protocol converter using the anycast address. Further, a protocol converter may redirect a request sent to the anycast address to a unicast address specific to the protocol converter to avoid service disruptions due to changes in network routing.

Figure 3:
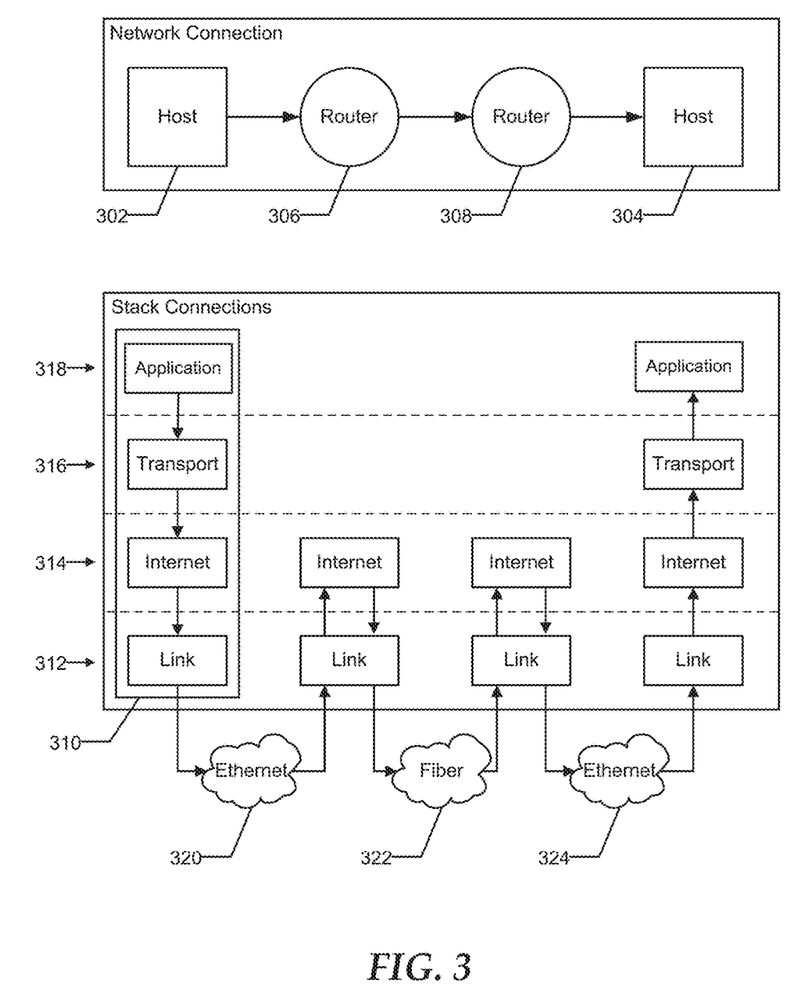
FIG. 3 is a block diagram illustrating a communication between computer systems in accordance with the TCP/IP communications model.

FIG. 3 illustrates communication between host 302 and host 304 according to the TCP/IP communications model. Communication between host 302 and host 304 can travel along a network path including router 306 and router 308.

In an embodiment, communication stack 310 at host 302 can include link layer 312, Internet layer 314, transport layer 316, and application layer 318. Communication between an application running on host 302 and an application running on host 304 can occur by passing information down the communication stack 310, through the network to host 304, and up the communication stack at host 304.

Link layer 312 is the lowest layer of communication stack 310. Link layer 312 can move data packets between Internet layer interfaces of two different hosts on the same link For example, link layer 312 can move data packets between Internet layer 314 on host 302 and Internet layer 314 on router 306 through an Ethernet link 320. The link layer 312 can add a frame header to prepare a packet for transmission over the network link. For example, the link layer 312 can translate the Internet Protocol (IP) address to a data link address such as a Media Access Control (MAC) address. For example, the link layer 312 at host 302 can include the data link address for router 306 in the link layer header. Additionally, the link layer 312 can be responsible for transmitting the frame over the network link.

Internet layer 314 can be responsible for routing packets through one or more network links to a destination. For example, the Internet layer 314 can be responsible for ensuring a data packet moves from host 302 to host 304 through Ethernet link 320, fiber link 322, and Ethernet link 324. Internet layer 314 can determine the next device along the path to reach the destination at each point between network links. For example, Internet layer 314 at host 302 can determine router 306 is the next device along the path. At router 306, Internet layer 314 can determine that router 308 is the next device along the path and at router 308, Internet layer 314 can determine the next device is host 304. At host 304, the Internet layer 314 can determine that the packet has reached the final destination and pass the packet contents up the communication stack. Additionally, Internet layer 314 can add an IP header including source and destination addresses to the packet. The IP header allows devices along the path to know the destination address to reliably route traffic through the network. Additionally, the end point can use the source address in the IP header to determine the address of the sender so that a response can be sent.

Transport layer 316 utilizes a transport layer protocol, such as transmission control protocol (TCP) or user datagram protocol (UDP). Transport layer 316 is responsible for end-to-end message transfer independent of the underlying network. Additionally, transport layer 316 can provide error control, flow control, congestion control, and application addressing. The transport layer 316 encapsulates data provided by application layer 318 within one or more packets or datagrams in accordance with the transport layer protocol. Transport layer 316 can add headers to the packet. The headers can be used, for example, to ensure correct ordering of the packets, to detect and correct transmission errors, and the like.

Application layer 318 can utilize application layer protocols to enable communication between an application running on host 302 and an application running on host 304. For example, a web server application on host 302 can communication with a web browser application on host 304 to provide a web page. Examples of an application layer protocol can include file transfer protocol (FTP), hypertext transfer protocol (HTTP), real-time transport protocol (RTP), Real Time Streaming Protocol (RTSP), or the like.

A router, such as router 306, can process the data packet at Internet layer 314 to determine the next device in the path to the destination. While the router may analyze the transport layer headers and the data using deep packet inspection to classify and filter packets, the router generally does not alter the transport layer headers or the data prior to forwarding the packet to the next device along the path.

In an embodiment, a protocol converter, such as protocol converter 202, can act as the end point for the communication. Specifically, the protocol converter receiving a multicast stream would extract the data from the multicast steam and in the process terminate all of the communication layers. For example, the protocol converter can perform error detection and correction and reorder packets received out of order to reconstruct the data or a portion thereof. The protocol converter can then reformat the data and pass the data through the communication stack for delivery to the client system. By extracting the data, the application layer protocols and transport layer protocols used to send data to the client system can be independent from the application layer protocols and the transport layer protocols used in the multicast transmission of the data. Further, by terminating the multicast session at the protocol converter, the need for software capable of terminating the multicast session at the client system can be eliminated. While methods are known for tunneling multicast sessions over a unicast only network, they typically require the client system to be running software capable of receiving the tunneled multicast session as well as terminating the multicast session, including performing error detection and correction and supporting the encapsulated application layer protocol, such as RTP or RTSP.

Figure 4:
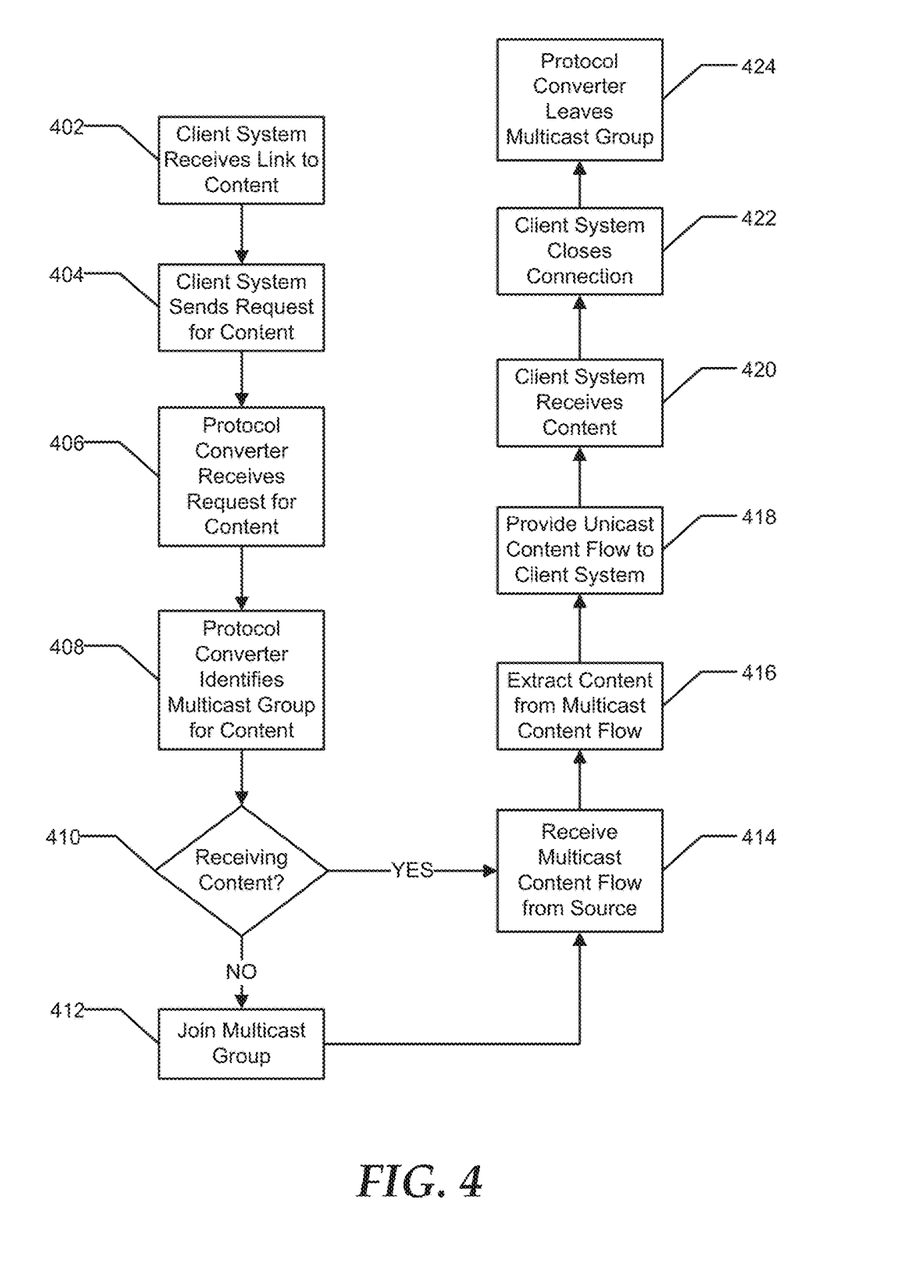
FIG. 4 is a flow diagram illustrating an exemplary method for converting a multicast protocol into a unicast protocol in accordance with an embodiment of the present disclosure.

FIG. 4 is a flow diagram illustrating an exemplary method for converting a multicast protocol into a unicast protocol in accordance with an embodiment of the present disclosure.

At 402, the client system can receive instructions for receiving content. For example, a web page may include a link to the content. Alternatively, the instructions may be received in an email, entered by a user, or provided by other means to the client system. The instructions for receiving the content can direct the client system to the protocol converter, such as by providing the address of the protocol converter. For example, the instructions can include a uniform resource locator (URL) identifying the protocol converter as the host. In an embodiment, information identifying the multicast can be embedded in the path of the URL. At 404, the client system can send a request to the protocol converter. In an embodiment, the request can include the information identifying the multicast. For example, the request can be a HTTP request for the URL, and the request can include the path having the multicast information embedded therein.

At 406, the protocol converter can receive the request for the content, and at 408, the protocol converter can identify the multicast group for receiving the content. For, example, the protocol converter can determine the multicast group based on the multicast information provided in the request. Alternatively, when the request does not include the multicast information, the protocol converter can utilize a mapping of a URL path to a multicast session or query a session information server to obtain the multicast session information.

At 410, the protocol converter can determine if the content is currently being received. For example, the content may be being received if another client system has previously requested the content.

When the protocol converter is not currently receiving the content, the protocol converter can join the multicast group, as illustrated at 412, and the protocol converter can receive the content as a multicast stream from a server, such as server 102, as illustrated at 414. Otherwise, if the protocol converter is already receiving the content and is already part of the multicast group, the protocol converter can receive the content at 414 without needing to join the multicast group.

At 416, the protocol converter can extract the content from the multicast stream. The protocol converter can terminate the application layer protocol, including performing error detection and correction of the content. Further, the protocol converter can assemble the content into the correct order.

At 418, the protocol converter can provide the content to the client system using a unicast communication flow. The protocol converter may reformat the content appropriately for the unicast protocol, such as by re-encapsulating the data for an appropriate HTTP content-type. Additionally, the content may be re-encoded as appropriate for the unicast protocol. In an embodiment, the protocol converter may provide a substantially similar unicast communication flow to each client system requesting the content. At 420, the client system can receive the content from the protocol converter.

At 422, the client system can close the connection to the protocol server when the client system no longer requires the content. At 424, the protocol converter can exit the multicast group and stop receiving the content when all connections to client systems receiving the content are closed.

In contrast with other methods for providing access to a multicast stream over a unicast only network, such as multicast tunneling, the protocol converter can act as a termination point for all of the communication layers and can establish a separate communication flow between the protocol converter and the client system that is separate from the multicast tree. Specifically, the protocol converter can terminate the application layer protocol, including handling any error correction used for the multicast communication, joining and exiting the multicast group, and any additional communication required of members of the multicast tree. Accordingly, the client system can be unaware of any multicast protocol used for the transmission of the content. Additionally, the client system can use standard client software applications, such as a web browser or a media player, and may not need special multicast-aware software to handle error detection and correction and support the encapsulated application layer protocol used with the multicast tree.

Figure 5:
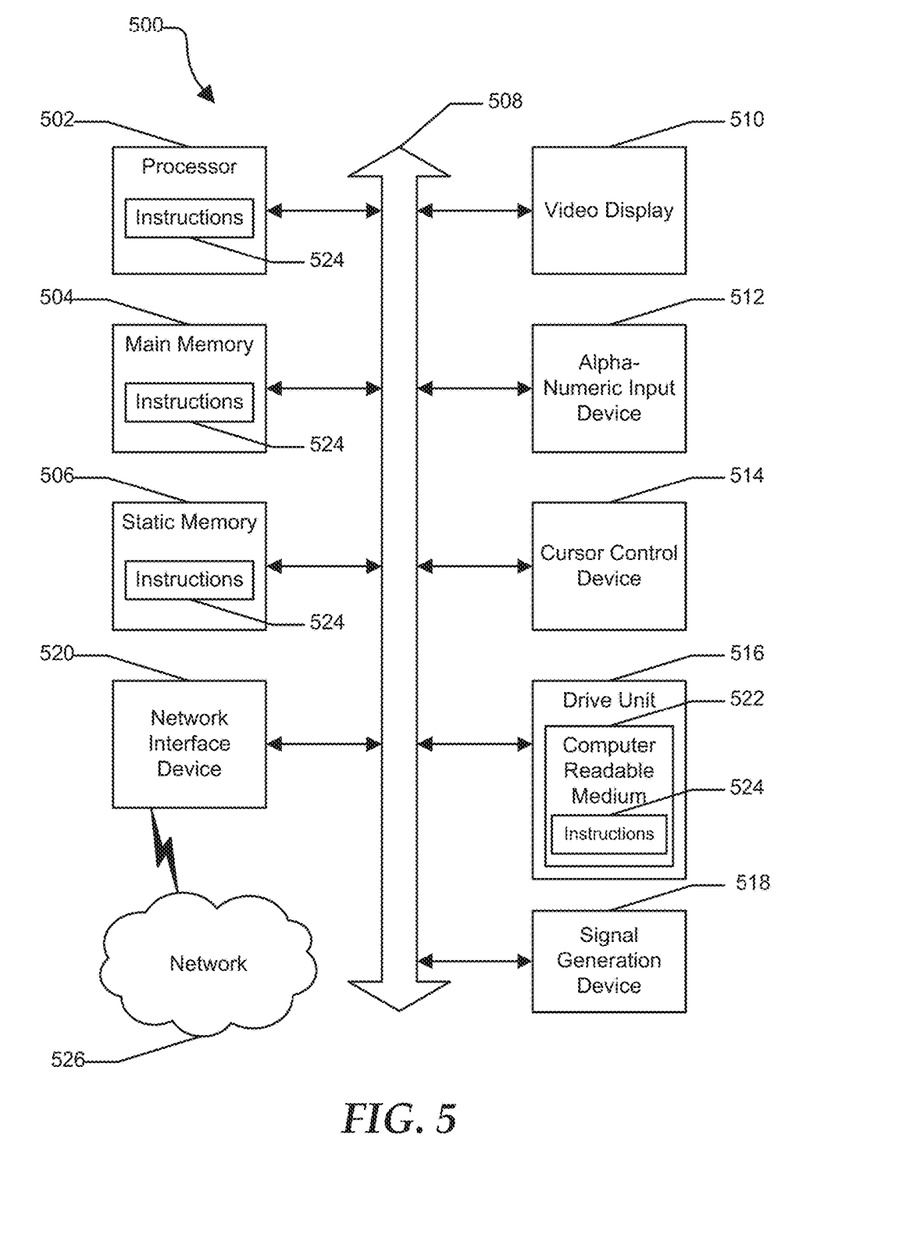
FIG. 5 is an illustrative embodiment of a general computer system.

FIG. 5 shows an illustrative embodiment of a general computer system 500. The computer system 500 can include a set of instructions that can be executed to cause the computer system to perform any one or more of the methods or computer based functions disclosed herein. The computer system 500 may operate as a standalone device or may be connected, such as by using a network, to other computer systems or peripheral devices. Examples of the general computer system can include content server 102, distribution point 120, client system 210, protocol converter 202, router 306, and the like.

In a networked deployment, the computer system may operate in the capacity of a server or as a client user computer in a server-client user network environment, or as a peer computer system in a peer-to-peer (or distributed) network environment. The computer system 500 can also be implemented as or incorporated into various devices, such as a personal computer (PC), a tablet PC, an STB, a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 500 can be implemented using electronic devices that provide voice, video or data communication. Further, while a single computer system 500 is illustrated, the term "system" shall also be taken to include any collection of systems or sub-systems that individually or jointly execute a set, or multiple sets, of instructions to perform one or more computer functions.

The computer system 500 may include a processor 502, such as a central processing unit (CPU), a graphics processing unit (GPU), or both. Moreover, the computer system 500 can include a main memory 504 and a static memory 506 that can communicate with each other via a bus 508. As shown, the computer system 500 may further include a video display unit 510 such as a liquid crystal display (LCD), an organic light emitting diode (OLED), a flat panel display, a solid-state display, or a cathode ray tube (CRT). Additionally, the computer system 500 may include an input device 512 such as a keyboard, and a cursor control device 514 such as a mouse. Alternatively, input device 512 and cursor control device 514 can be combined in a touchpad or touch sensitive screen. The computer system 500 can also include a disk drive unit 516, a signal generation device 518 such as a speaker or remote control, and a network interface device 520 to communicate with a network 526. In a particular embodiment, the disk drive unit 516 may include a computer-readable medium 522 in which one or more sets of instructions 524, such as software, can be embedded. Further, the instructions 524 may embody one or more of the methods or logic as described herein. In a particular embodiment, the instructions 524 may reside completely, or at least partially, within the main memory 504, the static memory 506, and/or within the processor 502 during execution by the computer system 500. The main memory 504 and the processor 502 also may include computer-readable media.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the FIGs. are to be regarded as illustrative rather than restrictive.

The Abstract of the Disclosure is provided to comply with 37 C.F.R. § 1.72(b) and is submitted with the understanding that it will not be used to interpret or limit the scope or meaning of the claims. In addition, in the foregoing Detailed Description of the Drawings, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description of the Drawings, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosed subject matter. Thus, to the maximum extent allowed by law, the scope of the present disclosed subject matter is to be determined by the broadest permissible interpretation of the following claims and their equivalents, and shall not be restricted or limited by the foregoing detailed description.

What is claimed is:

1. A system, comprising:
   a memory that stores instructions; and
   a processor that executes the instructions to perform operations, the operations comprising:
      causing a protocol converter to join a multicast session in response to a determination that the protocol converter is not currently receiving content,
         wherein an address of the protocol converter is identified in an email message sent to a first client system that generates a first request for the content,
         wherein the first request for the content is generated in response to a set of instructions provided in the email message sent to the first client system that identifies the protocol converter and identifies the protocol converter as a host for the content,
         wherein the email message is sent to the first client system prior to the first request being generated by the client system, wherein the email message identifies the protocol converter via a uniform resource locator, wherein information identifying the multicast session is embedded in the uniform resource locator that identifies the protocol converter; and providing, in response to the first request and in a first unicast communication, the content to the first client system, wherein the content is re-encapsulated based on a content type associated with the content;

providing, in response to a second request for the content, the content in a second unicast communication that is separate from the multicast session; and causing the protocol converter to exit a multicast group associated with the multicast session when a connection to the first client system that is receiving the content is closed.

2. The system of claim 1, wherein the operations further comprise determining if the content is currently being received by a second client system.

3. The system of claim 1, wherein the operations further comprise correcting the content.

4. The system of claim 1, wherein the operations further comprise performing error detecting on the content that is received via the multicast session.

5. The system of claim 1, wherein the operations further comprise causing the protocol converter to leave the multicast session after the content is provided to the first client system.

6. The system of claim 1, wherein the operations further comprise identifying the multicast group associated with the multicast session.

7. The system of claim 1, wherein the operations further comprise reordering packets of the content after receiving the content via the multicast session.

8. The system of claim 1, wherein the operations further comprise withdrawing a route to the protocol converter.

9. The system of claim 1, wherein the operations further comprise determining if the first client system no longer requires the content.

10. The system of claim 1, wherein the operations further comprise determining if a second client system has previously requested the content.

11. The system of claim 1, wherein the operations further comprise terminating an application layer protocol associated with the multicast session.

12. The system of claim 1, wherein the operations further comprise extracting the content from the multicast session.

13. A method, comprising:

causing, by utilizing a system including a processor, a protocol converter to join a multicast session in response to a determination that the protocol converter is not currently receiving content, wherein an address of the protocol converter is identified in an email message sent to a first client system that generates a first request for the content, wherein the first request for the content is generated in response to a set of instructions provided in the email message sent to the first client system that identifies the protocol converter and identifies the protocol converter as a host for the content, wherein the email message is sent to the first client system prior to the first request being generated by the client system, wherein the email message identifies the protocol converter via a uniform resource locator, wherein information identifying the multicast session is embedded in the uniform resource locator that identifies the protocol converter; and transmitting, by the system in response to the first request and in a first unicast communication, the content to the first client system, wherein the content is re-encapsulated based on a content type associated with the content;

providing, in response to a second request for the content, the content in a second unicast communication that is separate from the multicast session; and causing the protocol converter to exit a multicast group associated with the multicast session when a connection to the first client system that is receiving the content is closed.

14. The method of claim 13, further comprising determining if the content is currently being received by a second client system.

15. The method of claim 13, further comprising determining if the first client system no longer requires the content.

16. The method of claim 13, further comprising determining if a second client system has previously requested the content.

17. The method of claim 13, further comprising reordering packets of the content after receiving the content via the multicast session.

18. The method of claim 13, further comprising performing error detecting on the content that is received via the multicast session.

19. The method of claim 13, further comprising causing the protocol converter to leave the multicast session after the content is provided to the first client system.

20. A non-transitory computer-readable device comprising instructions, which, when executed by a processor, cause the processor to perform operations, the operations comprising:

instructing a protocol converter to join a multicast session in response to a determination that the protocol converter is not currently receiving content, wherein an address of the protocol converter is identified in an email message sent to a first client system that generates a first request for the content, wherein the first request for the content is generated in response to a set of instructions provided in the email message sent to the first client system that identifies the protocol converter and identifies the protocol converter as a host for the content, wherein the email message is sent to the first client system prior to the first request being generated by the client system, wherein the email message identifies the protocol converter via a uniform resource locator, wherein information identifying the multicast session is embedded in the uniform resource locator that identifies the protocol converter; and providing, in response to the first request and in a first unicast communication, the content to the first client system, wherein the content is re-encapsulated based on a content type associated with the content;

providing, in response to a second request for the content, the content in a second unicast communication that is separate from the multicast session; and causing the protocol converter to exit a multicast group associated with the multicast session when a connection to the first client system that is receiving the content is closed.

* * * * *